Jan. 5, 1954  C. E. WHITTLE  2,665,020
SELF-LOADING AND UNLOADING VEHICLE FOR PALLETIZED LOADS
Filed Nov. 8, 1950  4 Sheets-Sheet 1
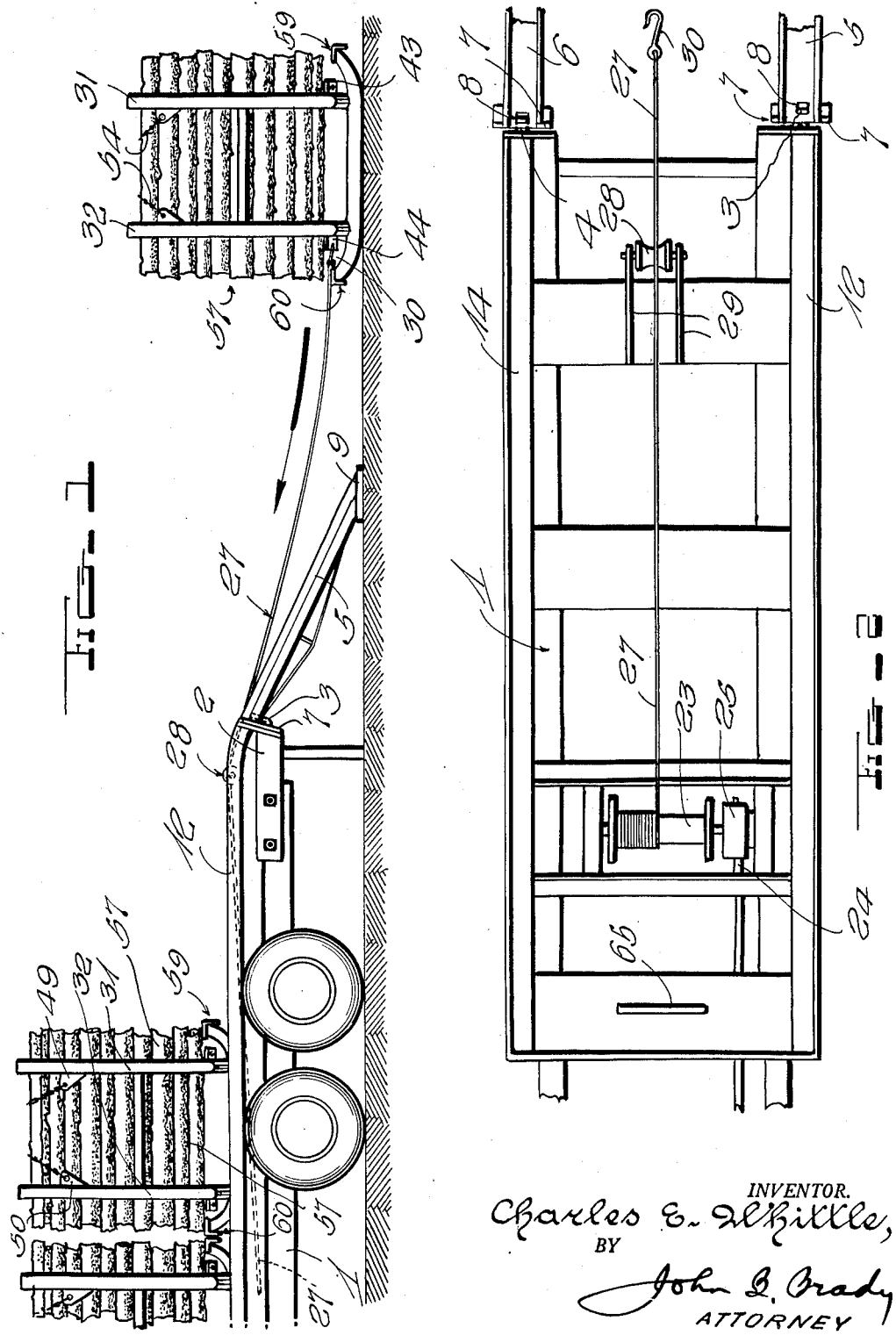
INVENTOR.
Charles E. Whittle,
BY
John B. Brady
ATTORNEY Jan. 5, 1954 C. E. WHITTLE 2,665,020
SELF-LOADING AND UNLOADING VEHICLE FOR PALLETIZED LOADS
Filed Nov. 8, 1950 4 Sheets-Sheet 2
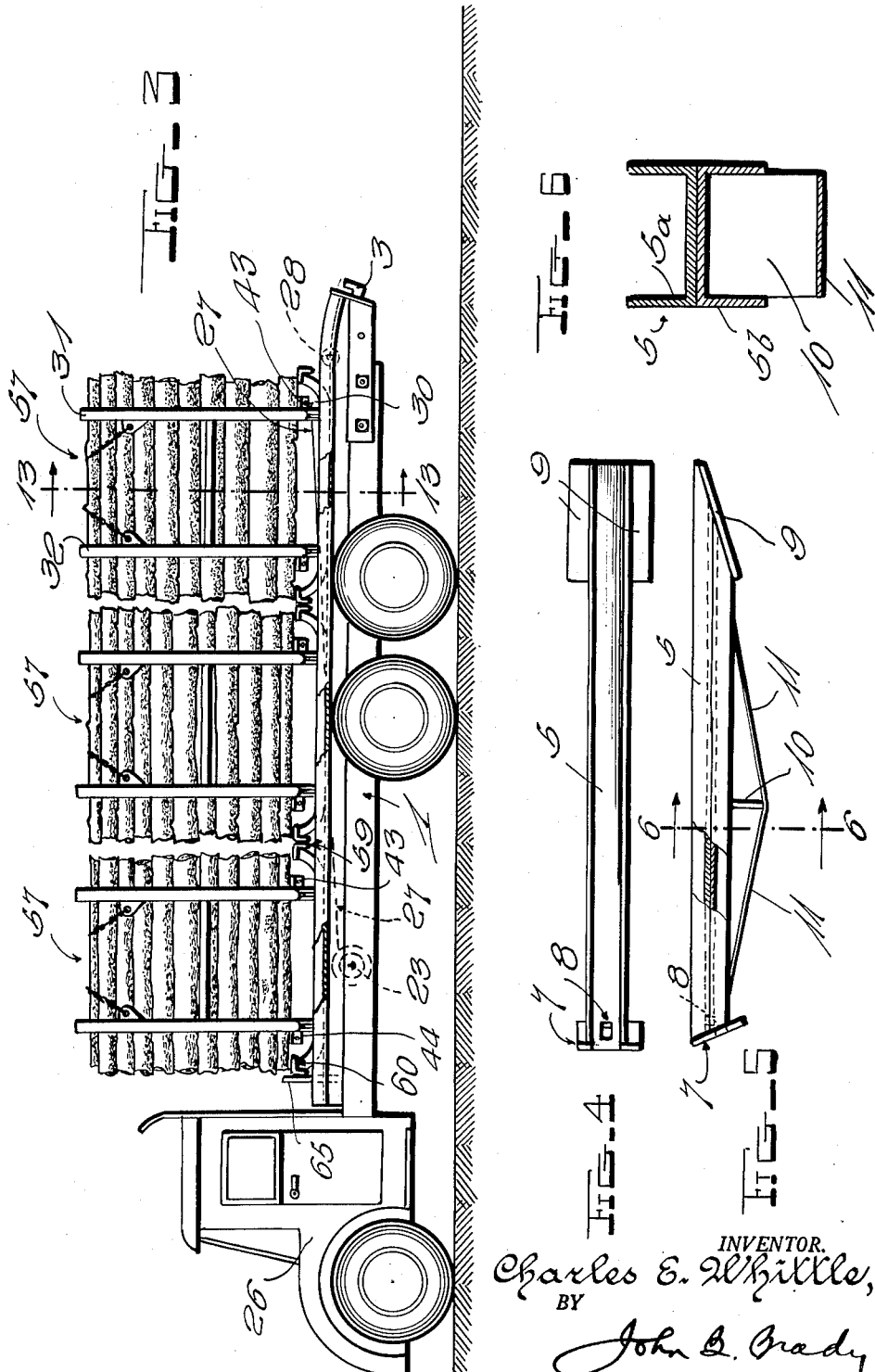
INVENTOR.
Charles E. Whittle,
BY
John B. Brady
ATTORNEY

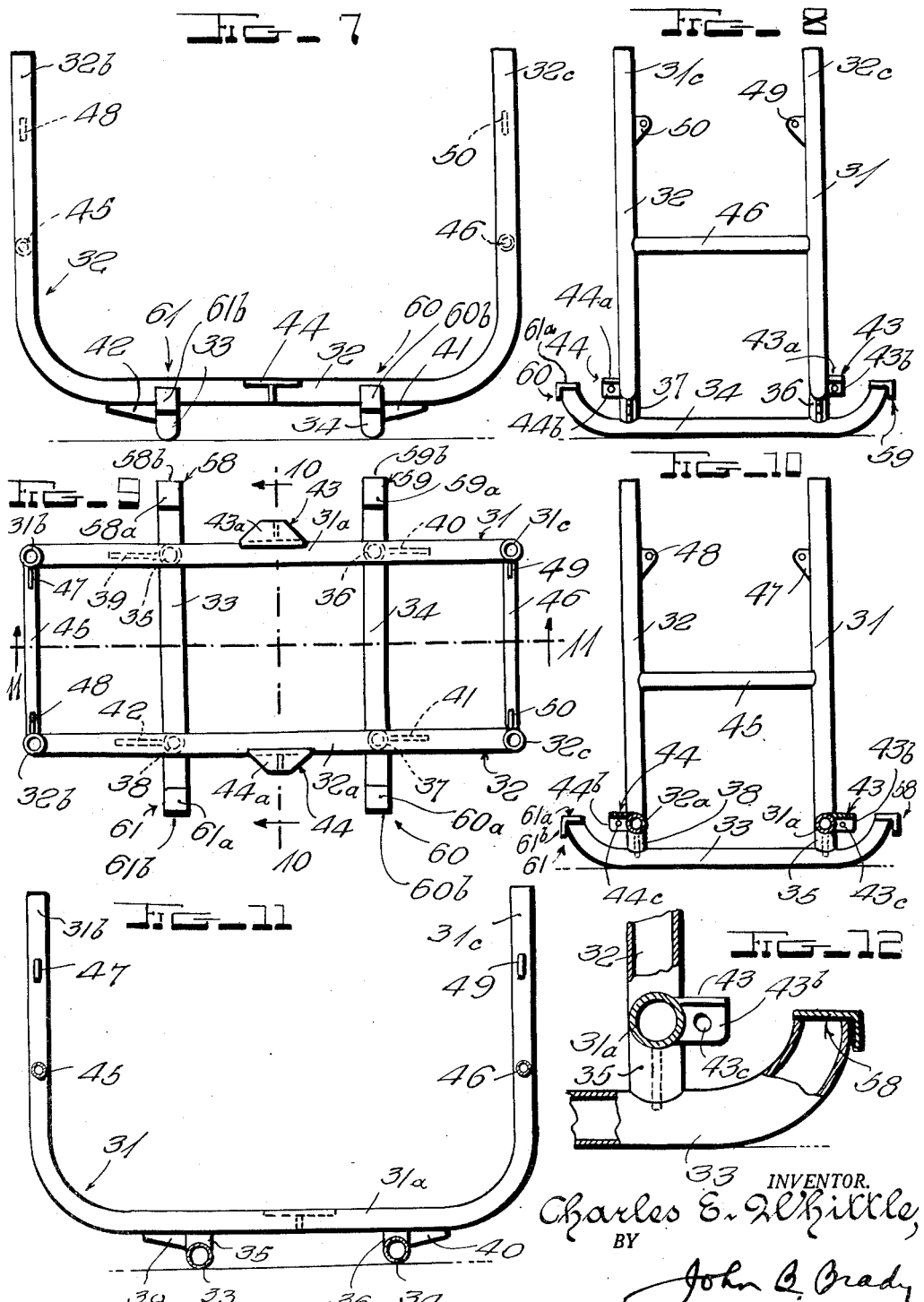

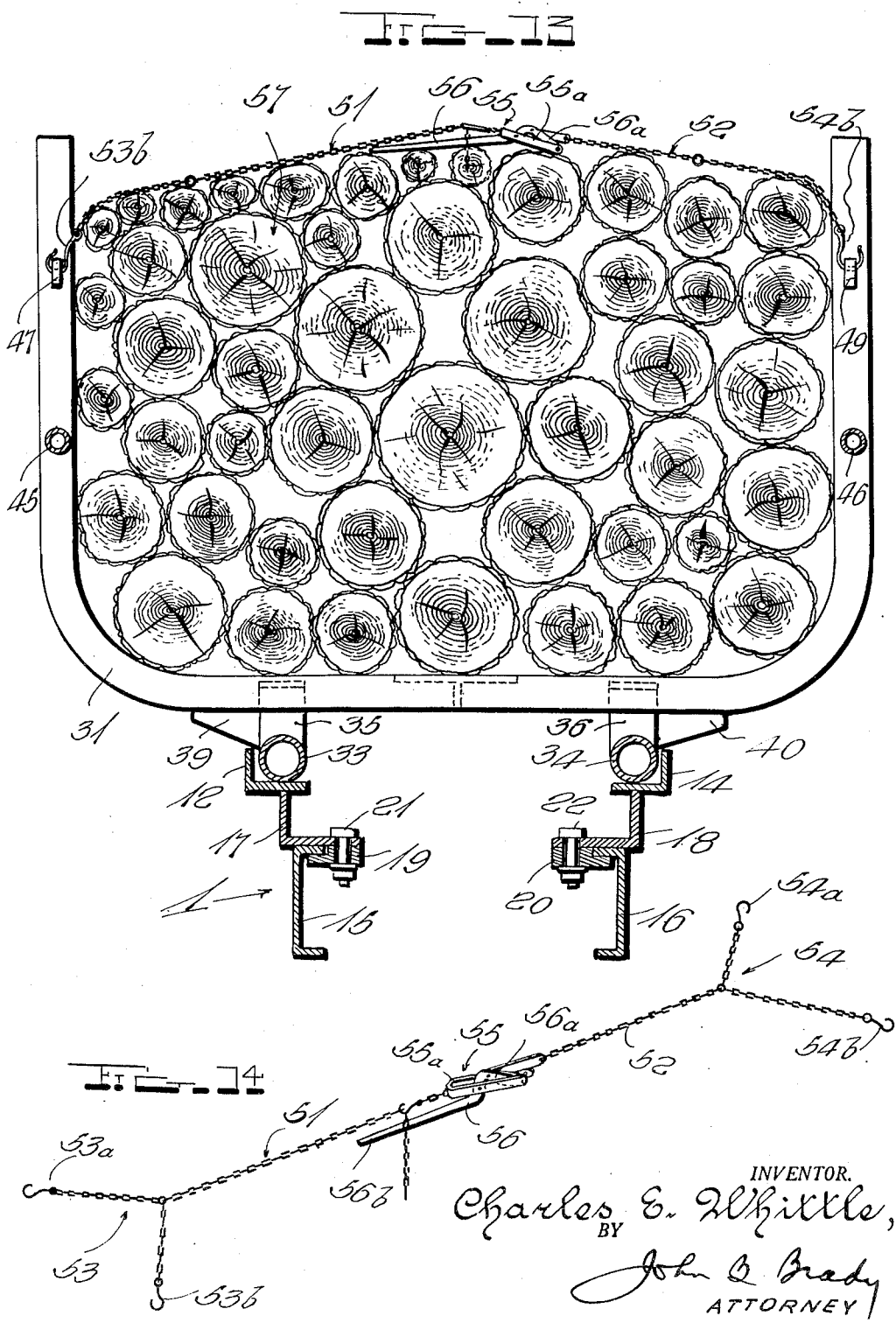

Patented Jan. 5, 1954

2,665,020

UNITED STATES PATENT OFFICE 2,665,020

SELF-LOADING AND UNLOADING VEHICLE FOR PALLETIZED LOADS

Charles E. Whittle, Brunswick, Ga.

Application November 8, 1950, Serial No. 194,672

7 Claims. (Cl. 214—517)

My invention relates broadly to transportation units for carrying logs and other materials and more particularly to a pallet system for loading, transporting and unloading logs and other materials from transportation units.

This application is a continuation-in-part of my application Serial Number 27,105, filed May 14, 1948, for Method and Apparatus for Loading and Transporting Logs and Other Materials, now Patent 2,529,752, dated November 14, 1950.

One of the objects of my invention is to provide a construction of pallet system for transportation units for loading, transporting and unloading logs and other materials which will effectively utilize all of the available transportation space and yet prevent interlocking of the logs or other material carried by adjacent pallets of the pallet system.

Another object of my invention is to provide an arrangement of pallets for supporting logs and other materials with respect to a transportation unit where the pallets are each provided with limiting abutments which coact with an adjacent pallet for positively spacing the pallets at such distances as will effectively utilize all of the transportation space and yet prevent interlocking of the logs or other materials supported by the adjacent pallets.

Still another object of my invention is to provide an arrangement of pallets for use on transportation units where the pallets are provided with supporting runners adapted to coact with rails on the transportation unit and where the runners terminate in abutment stops which coact with each other for positively spacing the pallets with respect to the transportation unit in such manner as will enable all of the transportation space to be effectively utilized and yet preclude interlocking of the logs or material supported by one pallet with the logs or material supported by an adjacent pallet.

Still another object of my invention is to provide a construction of pallet system for transportation units in which logs or other materials may be loaded, transported and unloaded with the logs or other materials extending in a direction substantially longitudinally of the transportation unit for more uniformly transporting the mass of the load and maintaining the center of gravity of the load low while effectively utilizing substantially the entire width available for movement of the transportation unit and without interlocking obstruction between the load on one pallet and the load on an adjacent pallet.

Still another object of my invention is to provide a construction of pallet system for transportation units including a frame structure which will positively limit the extent of projection of the load on opposite sides of the transportation unit for thereby avoiding the possibility of endwise projection of parts of the load beyond predetermined limits for avoiding the danger of accident due to side sweeping or actual obstruction of the loads on adjacent transportation units.

Other and further objects of my invention reside in the improved construction of a tubular frame for pallets and the coaction therewith of runners and tow connection means as set forth more fully in the specification hereinafter following by reference to the accompanying drawings in which:

Figure 1 is a side elevational view illustrating the application of the pallet system of my invention in the loading of a vehicle and illustrating particularly the manner in which the loaded pallets are positively spaced in coacting position on the vehicle after being loaded on the vehicle by operation of a winch and tow line with the pallet moved to loaded position on the vehicle by means of runners coacting with a ramp and rails on the transportation units; Fig. 2 is a top plan view of a vehicle showing the installation of the loading winch and tow line for sliding the pallets longitudinally of the rails carried by the vehicle; Fig. 3 is a side elevational view showing a vehicle fully loaded by means of the pallet system of my invention and ready for transportation; Fig. 4 is a plan view of one of the ramp sections; Fig. 5 is a side elevational view of the ramp section shown in Fig. 4; Fig. 6 is a transverse sectional view taken on line 6—6 of Fig. 5; Fig. 7 is an end elevational view of one of the pallets of the pallet system of my invention; Fig. 8 is a side elevational view of the pallet shown in Fig. 7; Fig. 9 is a plan view of the pallet; Fig. 10 is a vertical transverse sectional view taken on line 10—10 of Fig. 9; Fig. 11 is a longitudinal vertical sectional view taken on line 11—11 of Fig. 9; Fig. 12 is a fragmentary enlarged detailed view of the limiting abutment stops carried by each of the runners and the arrangement of the tow line connection means for the pallets; Fig. 13 is a transverse vertical sectional view of one of the loaded pallets taken substantially on line 13—13 of Fig. 3 and showing the manner in which the runners coact with longitudinally extending rails on the transportation unit; and Fig. 14 is a perspective view of the load binder employed in connection with the pallets.

My invention is directed to an improved construction over that illustrated in my co-pending application Number 27,105, filed May 14, 1948, for Method and Apparatus for Loading and Transporting Logs and Other Materials of which the instant application is a continuation-in-part. My present invention is applicable to any type of transportation unit such as a trailer, boat, aircraft or transportation unit operating on skids or runners. I construct the pallets in the system of my present invention in such manner that the pallets form limiting frame structures which preclude the projection of the log or other material carried by the pallets beyond a safe dimensional width. Pallets built in accordance with my present construction utilize full highway widths when installed on vehicles such as trailers or trucks enabling the passing of loaded trucks, trailers or other vehicles in the same or opposite directions without mishap. Moreover the pallet construction of my instant invention is such that pallets under full load may be loaded upon trucks, trailers or other transportation units and positively spaced from each other by end to end abutment of the shaped ends of the runners prohibiting interlocking of the load such as logs or other material on one pallet with a similar load on an adjacent pallet. I construct the pallets of my present invention from U-shaped tubular frames connected by longitudinally extending runners which engage longitudinally extending rails on the truck or trailer. The U-shaped tubular frames serve to confine the load extending longitudinally with respect to the truck or trailer and with respect to the direction of movement thereof and limiting the projection of the load on opposite sides of the truck or trailer. The runners which connect to the U-shaped frames terminate in end portions forming abutments which restrict and limit the approach of one pallet with respect to an adjacent pallet thereby positively spacing the pallets for prohibiting the interlocking of the load on one pallet with the load on an adjacent pallet. I provide tow connection means for the pallet frames which facilitate loading and unloading of trucks, trailers or other transportation units. I provide connection means on the U-shaped pallet frames which coact with binder chains which prevent shifting of the load such as logs or other material as the pallet is being loaded upon or unloaded from the transportation unit or during transportation. The improved construction shown herein has been found to be very successful in operation. I realize, however, that various modifications in structural details may be made and I desire that the disclosure herein be considered in the illustrative sense and not in the limiting sense.

Referring to the drawings in more detail, reference character 1 represents a truck or trailer or other transportation unit having a rear frame structure 2 thereon terminating in symmetrically arranged hook members 3 and 4 adjacent opposite sides of the vehicle chassis. The hook members 3 and 4 serve as connection means for the upper ends of the ramps 5 and 6. The ramps 5 and 6 are shown more clearly in Figs. 4–6 as comprising a massive structural member such as 5 with a broad flanged end 7 at the upper end of the ramp perforated adjacent thereto as represented at 8 for receiving and engaging the hook such as 3 for securing the ramp at an inclined position as represented in Fig. 1 with the lower end thereof provided with a flat horizontal flange 9 engageable with the road bed. The structural members constituting each ramp are substantially channel shaped formed by a pair of channels having their web portions secured back to back as represented more clearly in Fig. 6 where the ramp is shown as formed by channels 5a and 5b welded with their webs back to back. The lower-most channel is further reinforced by an intermediate downwardly projecting plate 10 reinforced by stay 11 extending from opposite ends of the channel 5b to the downwardly extending plate 10. As thus reinforced, the ramps are capable of withstanding the heavy mass of the pallets as the pallets are moved up the ramp. The channel-shaped member 5a constitutes a guide track for the runners of the pallets and are disposed in alignment with the longitudinally extending guide rails 12 and 14 on the transportation unit.

The ramps 5 and 6 are stowed in position upon the chassis of the transportation unit 1 during movement of the transportation unit preparatory for installation in position to allow movement of the pallets up and down the ramp during loading and unloading.

The transportation unit 1 is provided with a pair of longitudinally extending channels 15 and 16 which support the angle members 17 and 18 and which in turn support the longitudinally extending guide rails 12 and 14. The angle members 17 and 18 are firmly secured to the channel members 15 and 16 by clamping means disposed at spaced intervals along the length thereof as represented at 19 and 20 in Fig. 13. The clamping means are secured in position by bolt members 21 and 22 which pass through the angle members 17 and 18 and through the clamping means 19 and 20 which are recessed to grip the top webs of the channel members 15 and 16. Thus a rigid structure is provided on the transportation unit for guiding the several pallets onto or off the chassis during loading and unloading operations.

The chassis 1 has installed therein adjacent the forward end thereof the power driven winch 23 which may be operated through the conventional worm 24 and worm gear mechanism 25 from power on the truck represented at 26. The winch 23 may be power operated from a power source directly mounted upon the transportation unit if desired. A cable system 27 is operated by the winch 23 over an idler roller 28 support adjacent the other end of the transportation unit on suitable bracket supports represented at 29. The cable system 27 includes a hook 30 which is adapted to engage a cooperating eyelet on the pallets for moving the pallets to loaded position represented in Fig. 1.

The structure of the pallets is shown more clearly in Figs. 7–13 where the pallets each comprise U-shaped tubular frames represented at 31 and 32 extending in positions transversely of the direction of loading of the pallet onto and off the transportation unit. The U-shaped tubular frames 31 and 32 have horizontally extending portions 31a and 32a which connect with the vertically extending portions 31b and 31c; and vertically extending portions 32b and 32c respectively. The horizontally extending portions 31a and 32a of the U-shaped members 31 and 32 are interconnected at their bottom surfaces by spaced parallel extending tubular runners shown at 33 and 34. The tubular runners 33 and 34 are coupled to the bottom surfaces of the horizontally extending portions 31a and 32a of the U-shaped members 31 and 32 through vertically disposed spacer members 35, 36, 37 and 38 shown more clearly in Fig. 12. The spacer members each comprise tubular portions which are milled transversely of the axis thereof with the milled portion at the top of the spacer member extending on an axis coincident with the axis of the horizontally extending portion of the U-shaped tubular frame which is supported thereby while the lower end of the tubular spacer member is milled on an axis oriented 90° from the aforesaid axis and shaped to receive the top surface of the runner. Thus the four spacer members 35, 36, 37 and 38 elevate the U-shaped frame members 31 and 32 above the runners 33 and 34 sufficiently to enable loading of the U-shaped frame members with logs and the like free and clear of the runners beneath the pallet structure. In order to reinforce and strengthen the coupling between the runners, the spacer members and the bottom of the horizontally extending portions of the pallet structure I provide gusset plates 39, 40, 41 and 42 forming braces or reinforcements between the exterior side walls of the spacer members and the bottom of the horizontally extending portions of the U-shaped frame members 31 and 32 and runners 33 and 34, the gusset plates being disposed along the central axes of the U-shaped frame members and the coacting vertically disposed spacer members.

The horizontally extending portions 31a and 32a of the U-shaped frame members 31 and 32 are provided along their central axis between the runners 33 and 34 with tow plate members 43 and 44. The tow plate members are of T-shaped construction as shown more particularly in Fig. 7 having a welded connection with the opposite exterior walls of the horizontally extending portions of the U-shaped frame members 31 and 32. The tow plate members have their top portions 43a and 44a extending substantially tangent with the top surface of the horizontally extending portions 31a and 32a of the U-shaped frame members 31 and 32 and their vertically extending portions 43b and 44b disposed coplanar with the central horizontally extending axis of the pallet. The vertically extending portions 43b and 44b of the tow plate members 43 and 44 are provided with an eyelet which I have represented at 43c and 44c which serve for the insertion of the hook 30 for moving the pallet up the ramp onto the transportation unit.

The pallet is reinforced at opposite sides by interconnecting struts represented at 45 and 46 which are welded between the upwardly extending portions 31b and 33b and 31c and 32c of the pallets as shown. The interior surfaces of the vertically extending portions of the tubular frame members 31 and 32 at the inner adjacent sides thereof are provided with binder chain lugs shown at 47, 48, 49 and 50 each of which are apertured to receive the hooks on the ends of the binder chain represented more clearly in Fig. 14. The binder chain includes two sections represented at 51 and 52 which terminate in Y portions 53 and 54 each of which have hook members 53a and 53b and 54a and 54b on the terminating ends thereof adapted to establish connection with the eyelets in the binder chain lugs 47, 48, 49 and 50 respectively represented more particularly in Fig. 13. The chains 51 and 52 terminate in coacting parts of a lever operated clamp shown at 55 comprising the substantially U-shaped portion 55a connected at its center with the chain 51 and with a pivotal connection in its other end for a bell crank 56 which has an extension 56a thereon and an operating handle 56b thereon. The extension 56a connects with the portion 52 of the binder chain whereby operation of the bell crank 56 serves to tighten the binder chain about the load carried by the pallet, such as the load of logs represented generally at 57 in Fig. 13 for securing the load in position on the pallet preparatory for loading as represented in Fig. 1 and for transportation as represented in Fig. 3.

The runners 33 and 34 heretofore described are tubular in construction and are so spaced that they will align with and longitudinally slide upon guide rails 12 and 14 as shown more particularly in Fig. 13. The runners extend horizontally beneath the U-shaped frame members 31 and 32 spaced therefrom by the vertically disposed spacer members 35, 36, 37 and 38 and extend upwardly at each end thereof to a position terminating below a plane extending horizontally through the top surface of the horizontally extending portions 31a and 32a of U-shaped frame members 31 and 32. The upwardly curved terminating ends of the runners are capped by angle members which I have shown at 58, 59, 60 and 61. These angle members have their horizontally extending portions 58a, 59a, 60a and 61a extending across the terminating ends of the tubular runners 33 and 34 and have their vertically extending portions 58b, 59b, 60b and 61b depending downwardly across the front of the runners. The downwardly depending portions 58b, 59b, 60b and 61b form abutment stops for limiting the approach of one pallet system with respect to an adjacent pallet system as shown more clearly in Figs. 1 and 3. The abutment stops formed by contacting adjacent vertically disposed faces 58b, 59b, 60b and 61b at the ends of the runners contact each other before the load on one pallet approaches the load on an adjacent pallet so that the immediate adjacent loads cannot interlock end to end. Where the load is constituted by logs as shown in Figs. 1, 3 and 13, these logs are cut to length so that they do not extend beyond the limits of the abutment stops on the coacting adjacent runners so that interlocking of the logs is prevented. This is a distinct advantage in loading and unloading logs as the full width of the available transportation space such as the space available on highways may be utilized while a better distribution of the load and a lower load height is obtained.

In loading the transportation unit the first of the pallet structures to be moved up the ramps 5 and 6 is engaged by the hook 30 on the end of the cable system 27 engaged within the eyelet on tow plate member 44 on the front of the pallet structure and moved by operation of the winch 23 up the ramps 5 and 6 to a position in which the vertically extending plane portion of angle member 60 abuts with the limiting stop 65 adjacent the front of the transportation unit as illustrated in Figs. 2 and 3. As the several pallet structures are moved up the ramps 5 and 6 in abutting relation to the previous pallet structure as represented in Fig. 3 the cable system 27 has the hook 30 thereof engaged in the eyelet of the tow plate 43 of the last of the pallet structures to be mounted on the transportation unit as shown in Fig. 3. The cable system 27 thus engaged with the last of the pallet structures is locked with reference to the winch 23 and cannot be unwound therefrom until the winch is released. Thus all of the pallet structures are positively maintained in position on the transportation unit in abutment against the limiting stop 65 and prevented from sliding off the transportation unit such as might be the tendency where the transportation unit may assume a rearwardly directed inclination encountered where the transportation unit may be operated up a steep hill.

The structure of the hook members 3 and 4 for securing the ramps 5 and 6 in position is such that the hooks do not project above the perforations 8 in the ramps 5 and 6 thereby eliminating any obstruction to the runners 33 and 34 on the pallet structures as the pallet structures are moved into position on or removed from the transportation unit.

In unloading the transportation unit the pallet structures are successively engaged by a hook on the end of a tow line where the hook is engaged through the eyelet in the tow plate 43 of each pallet structure and the tow line connected to a tractor for pulling the pallet structures along the guide rails 12 and 14 and down the ramps 5 and 6 for unloading the transportation unit.

Throughout the several figures the pallet structures have their corresponding component parts indicated by the same reference characters for the reason that the pallet structures are all uniformly constructed and have the same corresponding parts.

I have found the pallet structure and the method of loading and unloading such pallet structures on transportation units as set forth herein highly useful in transporting logs to pulpwood mills. I realize that modifications in the details of construction of the pallets may be made and I desire that it be understood that no limitations upon my invention are intended other than may be imposed by the scope of the appended claims.

What I claim as new and desire to secure by Letters Patent of the United States is as follows:

1. A pallet structure for transporting heavy loads on guide rails of a transportation unit comprising a pair of spaced longitudinally extending hollow tubular runners each having a central horizontally extending portion and an upwardly curved portion at each end thereof, a pair of transversely extending hollow tubular frame members disposed in spaced relation with respect to said hollow tubular runners, spacer members, said spacer members being recessed transversely at their lower ends to engage said runners and being recessed at their upper ends to engage said frame members, said spacer members extending vertically from said runners and establishing coupling connection with said frame members for elevating said frame members with respect to the terminating ends of said runners, means extending between said frame members and said runners for reinforcing said runners, and limiting stops carried by the terminating ends of said runners for restricting the approach of one pallet structure with respect to an adjacent pallet structure when in aligned position on the guide rails of the transportation unit.

2. A pallet structure for transporting heavy loads on guide rails of a transportation unit as set forth in claim 1 in which said limiting stops comprise angle members each having a horizontally extending portion secured to the top portion of each of said runners and a vertically disposed depending portion forming an abutment face establishing contacting relation with a similar abutment face on aligned runners of an adjacent pallet structure.

3. A pallet structure for transporting heavy loads on guide rails of a transportation unit as set forth in claim 1 in which T-shaped members are secured to the central portions of said frame members between said runners with the top portions of said T-shaped members substantially tangent to the bottom surface of said frame members and the vertically extending portions of said T-shaped members having connection means thereon for establishing a tow line connection with said pallet structure in a position between said runners.

4. A pallet structure for transporting heavy loads on guide rails of a transportation unit as set forth in claim 1 in which the spacer members elevating the frame members above said runners are hollow tubular posts in which the transverse recesses at their upper and lower ends are disposed on axes extending 90° with respect to each other, the recesses at the lower ends of the posts connecting with the top surfaces of said runners and the recesses at the upper ends of the posts connecting with the lower surfaces of said frame members and wherein gusset plates extend between opposite exterior surfaces of said posts and the lower surfaces of said frame members for reinforcing said frame members.

5. A pallet structure for transporting heavy loads on guide rails of a transportation unit as set forth in claim 1 in which said frame members extend vertically and form opposite sides of the pallet structure and means interconnecting the vertically extending portions of the pallet structure for strengthening said frame members for confining a load.

6. A pallet structure for transporting heavy loads on guide rails of a transportation unit as set forth in claim 1 in which said spacer members are of conforming tubular construction with respect to said frame members and runners with the recesses in the upper ends of said spacer members shaped on a transverse axis to seat the transversely extending tubular frame members and in which the recesses in the lower ends of said spacer members are shaped to engage the upper surfaces of said runners, the exterior surfaces of said spacer members being connected through gusset plates aligned with the central axis of the lower surface of each frame member for reinforcing the same.

7. A pallet structure for transporting heavy loads on guide rails of a transportation unit as set forth in claim 1 in which said runners are curved upwardly at each end thereof to a position terminating below the plane of the top of the transversely extending frame members and wherein said limiting stops are constituted by angle members each having a horizontally extending portion and a vertically extending portion, with the said horizontally extending portion projecting across the terminating end of the runner and with the vertically extending portion forming a depending skirt establishing an abutting surface with a coacting structure on an adjacent pallet structure for limiting the approach of one pallet structure with respect to an adjacent pallet structure.

CHARLES E. WHITTLE.

References Cited in the file of this patent

UNITED STATES PATENTS

| Number | Name | Date |
|---|---|---|
| 885,162 | Kirchner | Apr. 21, 1908 |
| 948,159 | Brown | Feb. 1, 1910 |
| 1,677,733 | Schiftner | July 17, 1928 |
| 1,678,329 | Clarke et al. | July 24, 1928 |
| 2,086,923 | Reeder et al. | July 13, 1937 |
| 2,188,374 | Sanchez | Jan. 30, 1940 |
| 2,461,887 | Fletcher | Feb. 15, 1949 |
| 2,467,354 | Baldwin | Apr. 12, 1949 |
| 2,605,914 | Hala | Aug. 5, 1952 |